US012669146B2

(12) United States Patent
Na

(10) Patent No.: US 12,669,146 B2
(45) Date of Patent: Jun. 30, 2026

(54) AIR FOIL BEARING INSTALLATION STRUCTURE

(71) Applicant: Pyong Hwa Valeo Co., Ltd., Dalseo-gu (KR)

(72) Inventor: Ju Hyung Na, Buk-gu (KR)

(73) Assignee: PYONG HWA VALEO CO., LTD., Dalseo-Gu (KR)

( * ) Notice: Subject to any disclaimer, the term of this patent is extended or adjusted under 35 U.S.C. 154(b) by 66 days.

(21) Appl. No.: 18/575,038

(22) PCT Filed: Jun. 27, 2022

(86) PCT No.: PCT/KR2022/009160
§ 371 (c)(1),
(2) Date: Dec. 28, 2023

(87) PCT Pub. No.: WO2023/277493
PCT Pub. Date: Jan. 5, 2023

(65) Prior Publication Data
US 2024/0295240 A1 Sep. 5, 2024

(30) Foreign Application Priority Data
Jun. 30, 2021 (KR) ........................ 10-2021-0085459

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01); *F16C 2360/43* (2013.01)

(58) Field of Classification Search
CPC ............................... F16C 17/024; F16C 27/02
See application file for complete search history.

(56) References Cited

U.S. PATENT DOCUMENTS

| | | | |
|---|---|---|---|
| 8,353,631 B2 | 1/2013 | Kim | |
| 9,719,556 B2 * | 8/2017 | Kim | ...................... F16C 17/024 |
| 2011/0052110 A1 * | 3/2011 | Kim | ...................... F16C 17/024 |
| | | | 384/106 |

(Continued)

FOREIGN PATENT DOCUMENTS

| | | | |
|---|---|---|---|
| JP | S5899514 A | 6/1983 | |
| JP | 20180125772 A | * 11/2018 | |

(Continued)

OTHER PUBLICATIONS

Machine Translation of KR-20180125772-A (Year: 2018).*

(Continued)

*Primary Examiner* — Alan B Waits
(74) *Attorney, Agent, or Firm* — Tarolli, Sundheim, Covell & Tummino LLP

(57) ABSTRACT

The present invention relates to an airfoil bearing installation structure in which a spacer is provided on a bent portion of a foil assembly, the spacer has catching pieces having elasticity, and catching projections are formed on an inner wall surface of a slot formed in a housing so that the catching pieces are caught by the catching projections. Therefore, it is possible to prevent an axial movement and separation of the foil assembly without additionally installing a separate component for blocking an inlet of the slot.

6 Claims, 8 Drawing Sheets

(56)                References Cited

U.S. PATENT DOCUMENTS

2017/0097039 A1 *    4/2017  Kim ........................ F16C 27/02
2019/0178286 A1 *    6/2019  Lee ....................... F16C 17/024

FOREIGN PATENT DOCUMENTS

| KR | 1020110023319 A | 3/2011 |
| KR | 1020190021541 A | 3/2019 |
| KR | 1020190027518 A | 3/2019 |
| KR | 1020190068970 A | 6/2019 |
| WO | WO-2022124857 A1 * | 6/2022 |

OTHER PUBLICATIONS

Machine Translation of WO-2022124857-A1 (Year: 2022).*
Japanese Office Action for JP application No. 2023-579094, dated
Feb. 18, 2025, 4 pages.
International Search Report (English and Korean) and Written
Opinion for International application No. PCT/ KR2022/009160,
dated Oct. 14, 2022, 11 pages.
EESR for EP application No. 22 83 3549.3, dated Jun. 24, 2025, 9
pages.

* cited by examiner

A-A

AIR FOIL BEARING INSTALLATION STRUCTURE

CROSS-REFERENCE TO RELATED APPLICATIONS

This application is a U.S. National Stage Application filed under 35 U.S.C. § 371 of PCT/KR2022/009160, filed Jun. 27, 2022, and entitled "AIR FOIL BEARING INSTALLA-TION STRUCTURE", which claims priority from Korean Patent Application No. 10-2021-0085459, filed on Jun. 30, 2021. The entire contents of each of the above-identified patent applications are incorporated herein by reference.

TECHNICAL FIELD

The present invention relates to an airfoil bearing instal-lation structure, and more particularly, to an airfoil bearing installation structure capable of preventing an axial separa-tion of an airfoil bearing.

BACKGROUND ART

An air compressor includes a rotor configured to be rotated by an electromagnetic force, and an impeller installed at an end of the rotor. The air compressor is configured to suck, compress, and then discharge air by rotating the impeller at high speed.

Meanwhile, a bearing using a rollable member such as a ball or a roller is not suitable to support the rotor, which rotates at high speed, because the bearing generates noise and vibration and requires a separate lubricant.

Therefore, an airfoil bearing configured to support a load by using an air film (air pressure) is applied.

As illustrated in FIG. 1, the airfoil bearing includes a bump foil 20 disposed along an inner circumferential surface of a hollow portion 11 of a housing 10 of the air compressor, and a top foil 30 disposed inside the bump foil 20. A rotor 40 is disposed inside the top foil 30, and the rotor 40 is configured to rotate in a state in which an inner circumfer-ential surface of the top foil 30 and an outer circumferential surface of the rotor 40 are spaced apart from each other.

Bent portions 21 and 31, which are bent radially outward, are formed at a circumferential direction end of the bump foil 20 and a circumferential direction end of the top foil 30. The bent portions 21 and 31 are inserted into a slot 13 formed in the housing 10, such that the bump foil 20 and the top foil 30 are fixed to the housing 10 without rotating in a circumferential direction.

However, when the rotor 40 rotates at high speed, a force, which pushes the bump foil 20 and the top foil 30 in an axial direction, is generated because of misalignment caused by component dispersion even though the force has a small magnitude. Therefore, there is a need for a structure for suppressing an axial movement of a foil assembly (referring to the bump foil and the top foil) to prevent the foil assembly from separating from an exact position in the slot 13.

Therefore, in the related art, as illustrated in FIG. 2A, a pinhole 14 is formed at an upper side of the slot 13 of the housing 10, a pin 15 is press-fitted into the pinhole 14, and a boundary portion of the pinhole 14 is subjected to caulking (caulking portions c), such that the pin 15 is not separated.

Therefore, the pin 15 suppresses the axial movements of the bent portions 21 and 31 of the foil assembly, thereby preventing the separation of the foil assembly.

In addition, as illustrated in FIG. 2B, a seating groove 16 is formed in a peripheral portion of a front surface of the slot 13 of the housing 10, a catching plate 17 is inserted and seated into the seating groove 16, and then the catching plate 17 is fixed to the housing 10 by a screw 18. In this case, the catching plate 17 blocks an inlet of the slot 13, such that the bent portions 21 and 31 of the foil assembly cannot move to the outside of the slot 13, thereby preventing the separation of the foil assembly.

However, in the above-mentioned installation structure, a gap g exists between the inside of the slot 13 and the bent portions 21 and 31. As a result, the bent portions 21 and 31 may inadvertently move in the circumferential direction in the slot 13, and the foil assembly may inadvertently move in the circumferential direction, which degrades the installation state stability of the foil assembly and the support stability of the rotor 40.

In addition, because the separate components such as the pin 15, the catching plate 17, and the screw 18 are used to prevent the axial separation of the foil assembly, there is a problem in that the number of components and the number of assembling processes are increased, and the assembling time is increased, which degrades the productivity.

DISCLOSURE

Technical Problem

The present invention has been made in an effort to solve the above-mentioned problem, and an object of the present invention is to provide an airfoil bearing installation struc-ture capable of preventing an inadvertent circumferential movement and axial separation of an airfoil bearing, reduc-ing the number of components and the number of assem-bling processes, reducing assembling time and manufactur-ing costs, and improving productivity.

Technical Solution

In order to achieve the above-mentioned object, the present invention provides an airfoil bearing installation structure including: a foil assembly including a bump foil and a top foil that overlap each other in a cylindrical shape; and a spacer mounted on a bent portion protruding from the foil assembly in a radial direction, in which the foil assembly and the bent portion are inserted into a bearing installation hole and a slot formed in a housing of an air compressor, and a circumferential gap in the slot is removed by the spacer.

The spacer may include: two opposite side plate portions; and a connection portion configured to connect rear ends of the two opposite side plate portions, and catching pieces may be formed by cutting front portions of the side plate portions in a longitudinal direction and bending outward upper portions disposed above cutting lines in two opposite directions.

The catching pieces may have elasticity so that the catching pieces are deformed and restored inward and outward from the spacer.

Accommodation portions may be formed in two opposite wall bodies at an inlet side of the slot so that the catching pieces of the spacer are inserted into the accommodation portions, and catching projections may be formed at slot inlet side ends of the accommodation portions so that ends of the catching pieces are caught by the catching projections.

A plurality of fastening holes may be formed in the bent portion of the foil assembly, fastening holes, which are equal in number to the fastening holes formed in the bent portion of the foil assembly, may be formed in two opposite side plate portions of the spacer, and fastening members may be installed to penetrate the fastening holes, such that the spacer is fixed to the bent portion.

The fastening member may include: a base configured to be in close contact with one side surface of the spacer; extension portions bent and extending horizontally from two opposite side portions of an upper end of the base and configured to penetrate the bent portion and the fastening holes of the spacer; and catching portions bent downward from ends of the extension portions and configured to be in close contact with the other side surface of the spacer.

A front end of the spacer may be opened, such that the spacer may be fitted with an outer side of the bent portion of the foil assembly in the axial direction.

Advantageous Effects

According to the present invention described above, the spacer is installed on the bent portion of the foil assembly, such that no gap is formed between the bent portion of the bump foil and the bent portion of the top foil, and no gap is present even between the bent portion and the slot.

Therefore, the inadvertent circumferential movement of the airfoil bearing (the foil assembly+the spacer) is prevented.

Meanwhile, the catching pieces, which are spread outward, are formed at the end of the spacer, and the catching projections are formed in the slot formed in the housing. Therefore, when the spacer is inserted into the slot, the catching pieces are caught by the catching projections, such that the axial movement and separation of the airfoil bearing are prevented.

As described above, unlike the related art, a pin or a catching plate is not used to prevent the axial separation, such that the number of components is not increased, the manufacturing costs and the number of assembling processes are reduced, and the productivity is improved.

MODE FOR INVENTION

Figure 1:
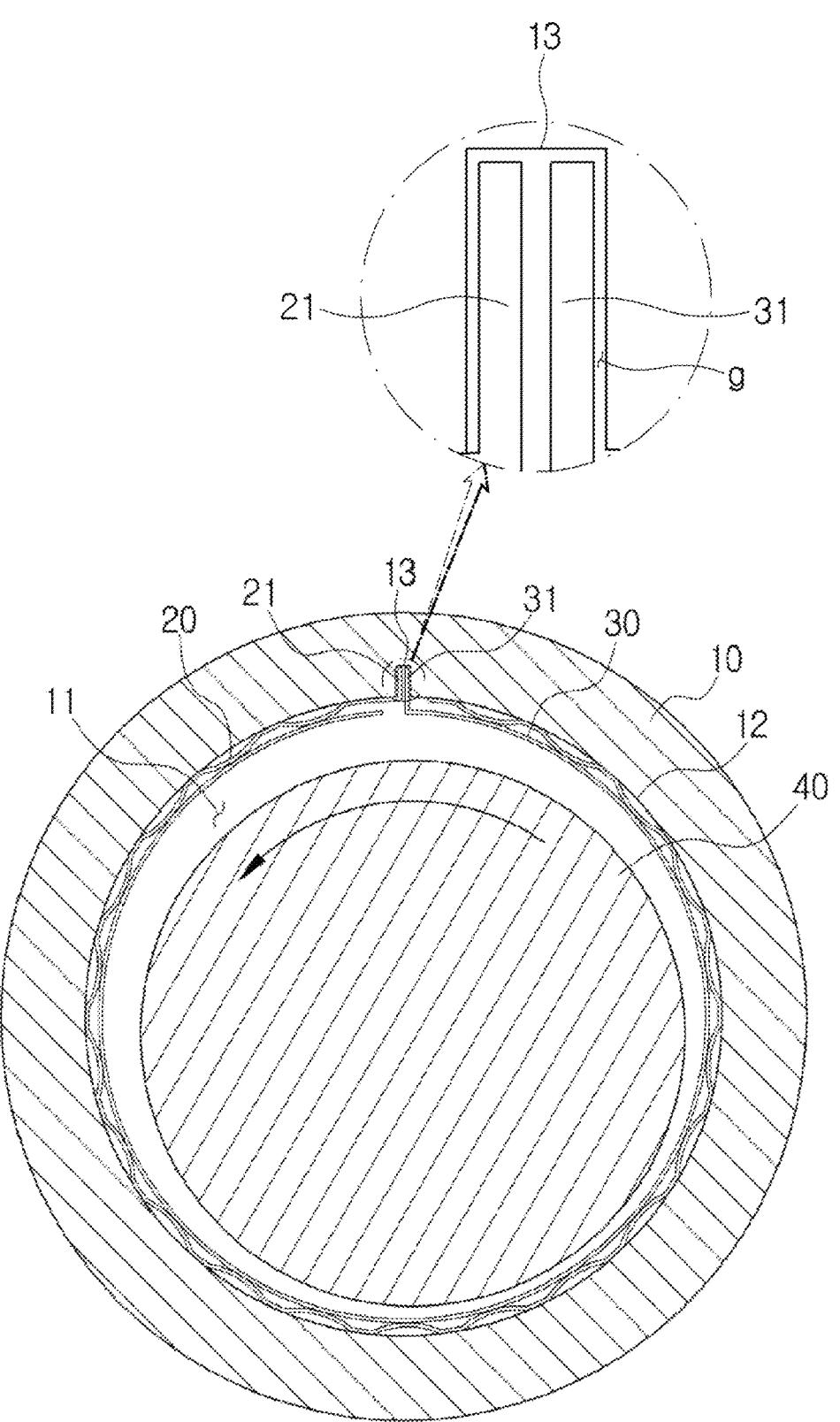
FIG. 1 is a cross-sectional view illustrating a state in which an airfoil bearing in the related art is installed.
Figure 2A:
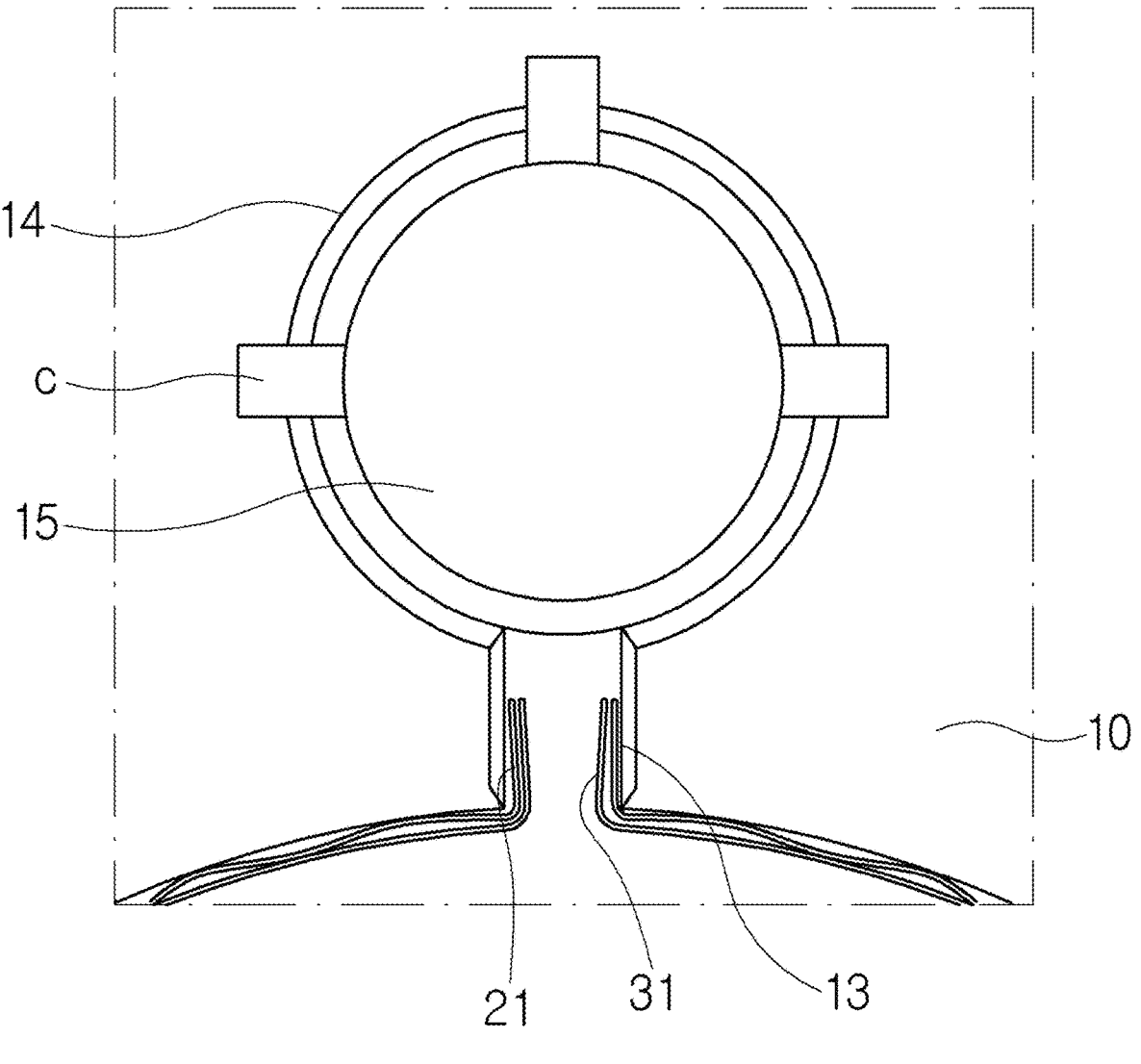
FIGS. 2A and 2B are views for explaining a structure for preventing an axial separation of the airfoil bearing.
Figure 2B:
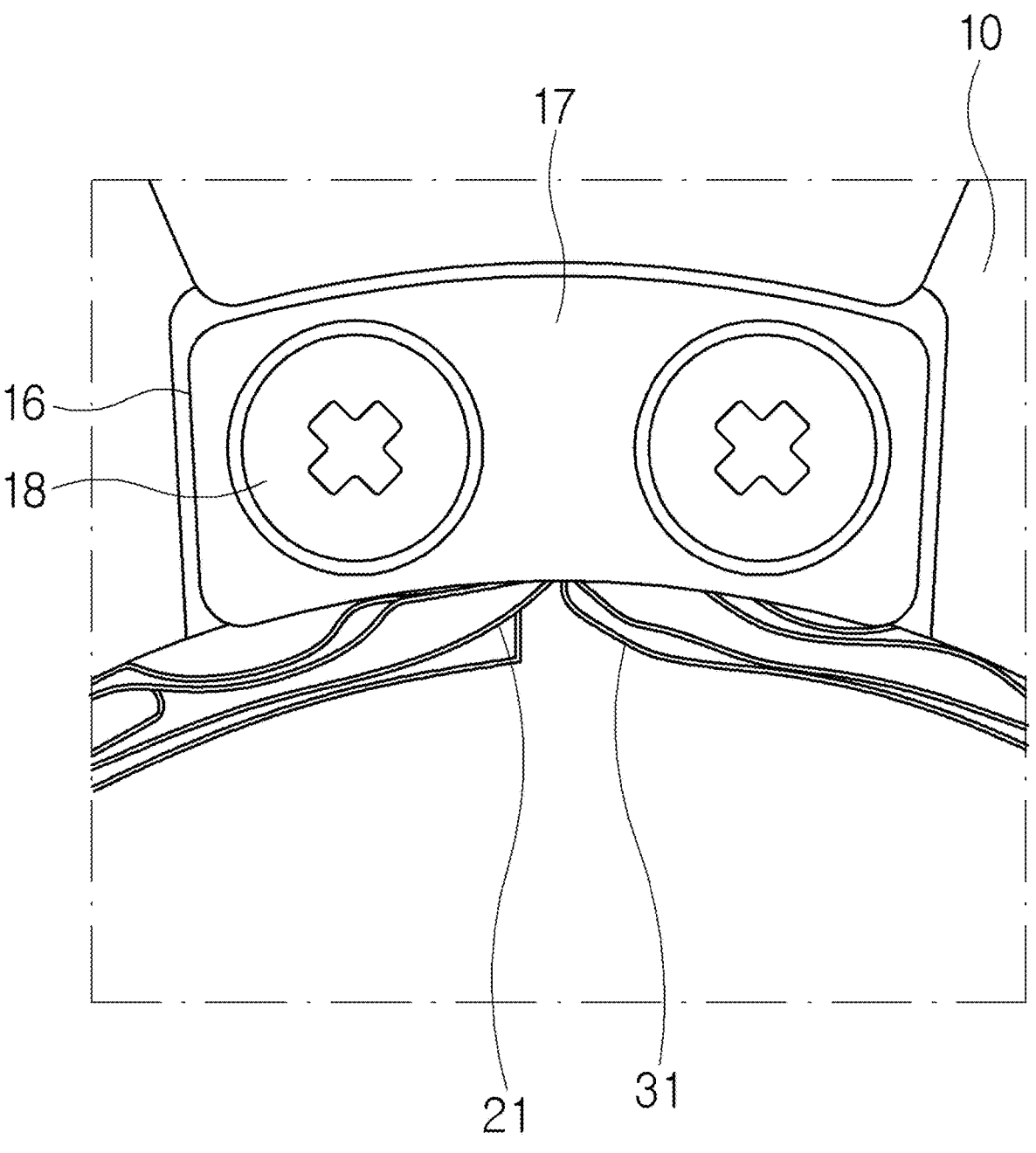

The present invention may be variously modified and may have various embodiments, and particular embodiments illustrated in the drawings will be described in detail below. However, the description of the embodiments is not intended to limit the present invention to the particular embodiments, but it should be understood that the present invention is to cover all modifications, equivalents and alternatives falling within the spirit and technical scope of the present invention. Thicknesses of lines illustrated in the accompanying drawings, sizes of constituent elements, or the like may be exaggerated for clarity and convenience of description.

In addition, the terms used below are defined in consideration of the functions in the present invention and may vary depending on the intention of a user or an operator or precedents. Therefore, the definition of the terms should be made based on the entire contents of the present specification.

Hereinafter, exemplary embodiments according to the present invention will be described in detail with reference to the accompanying drawings.

Figure 3:
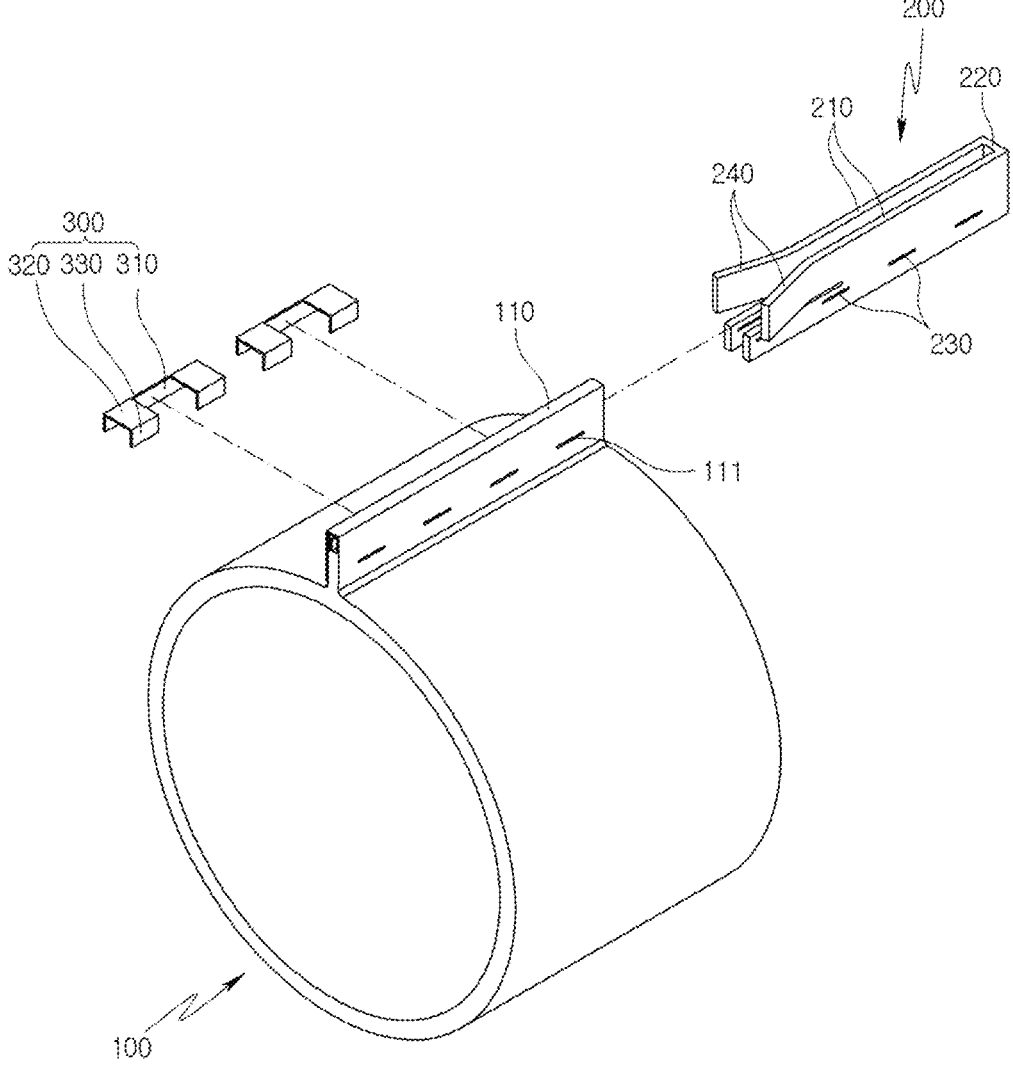
FIG. 3 is an exploded perspective view of an airfoil assembly according to the present invention.
Figure 4:
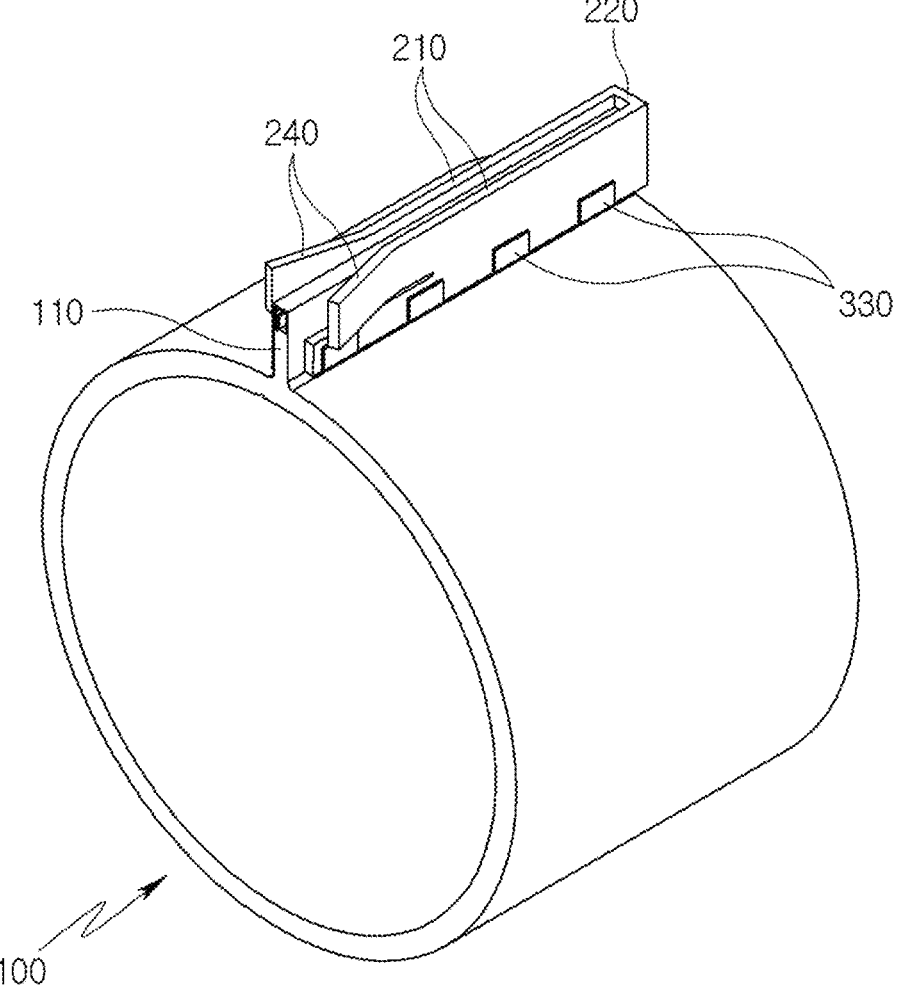
FIG. 4 is a view illustrating an assembled state of FIG. 3.

As illustrated in FIGS. 3 and 4, an airfoil bearing, which is one component of an airfoil bearing installation structure according to the present invention, includes a foil assembly 100, a spacer 200, and fastening members 300.

The foil assembly 100 has a cylindrical shape identical to a foil assembly in the related art and includes a bump foil and a top foil that overlap each other in a radial direction. The top foil is installed radially inward, has a simply cylindrical shape, and supports a load by using an air film formed between the top foil and a rotor. The bump foil has concave-convex shapes protruding in the radial direction and repeatedly formed in the circumferential direction. The bump foil is disposed between the top foil and an inner circumferential surface of a bearing installation hole 11 formed in a housing 10 and supports a load, which is transmitted from the top foil, while distributing the load to the housing 10.

Because the configuration of the foil assembly 100 is identical to that in the related art, the bump foil and the top foil are not distinctively illustrated in detail, and only an overall shape (cylindrical shape) is illustrated. In the drawings, reference numeral 110 indicates a 'bent portion' inserted into a slot 12 formed in the housing 10 to prevent an inadvertent circumferential movement of the foil assembly 100.

The bent portion 110 is configured by superimposing a bent portion of the bump foil and a bent portion of the top foil. A plurality of rectilinear fastening holes 111, which is formed through the bent portions in a transverse direction, is formed at predetermined intervals in the axial direction.

The spacer 200 is a component that clamps the bent portion of the bump foil and the bent portion of the top foil while surrounding an outer portion of the bent portion 110 and is fitted into the slot 12 formed in the bearing installation hole 11 so that no empty space is present in the slot 12, thereby preventing the bent portion 110 from inadvertently moving in a leftward/rightward direction in the slot 12, i.e., in the circumferential direction of the bearing installation hole 11.

The spacer 200 has a structure having a 'ㄷ'-shaped planar cross-section and including two opposite side plate portions 210 configured to surround two opposite surfaces of the bent portion 110, and a connection portion 220 configured to connect rear ends of the two opposite side plate portions 210. Therefore, a front end of the spacer 200 is opened, and the spacer 200 may be fitted with an outer side of the bent portion 110 through the opening portion.

In addition, a plurality of fastening holes 230, which is formed through the two opposite side plate portions 210, is formed through the spacer 200 and disposed at predetermined intervals in a longitudinal direction. When the spacer 200 is fitted with the outer side of the bent portion 110, all the fastening holes 111 of the bent portion 110 are coincident with all the fastening holes 230 of the spacer 200.

The fastening member 300 includes a base 310 having a rectangular board shape, extension portions 320 bent and extending in one direction from two opposite side portions of an upper end of the base 310, and catching portions 330 bent downward from ends of the extension portions 320. During a process of installing the fastening member 300, the catching portion 330 is bent after the extension portion 320 passes through the fastening holes 111 and 230.

In a completely fastened state, the base 310 and the catching portions 330, which are connected by the extension portions 320, are in close contact with and caught by outer surfaces of the two opposite side plate portions 210 of the spacer 200, such that the spacer 200 is securely fixed so that the fastening member 300 does not separate from the bent portion 110 and the spacer 200 does not separate from the bent portion 110.

Meanwhile, catching pieces 240 are formed on the two opposite side plate portions 210 with respect to the fastening member 300 and have shapes spread in a direction opposite to the connection portion 220, i.e., spread outward from ends of the opening portion. The catching piece 240 is formed by cutting the side plate portion 210 by a predetermined length in the longitudinal direction and bending outward an upper portion of the side plate portion 210 disposed above cutting lines, such that the catching piece 240 may be elastically deformed in the leftward/rightward direction and the transverse direction with respect to the bent portion.

Figure 5:
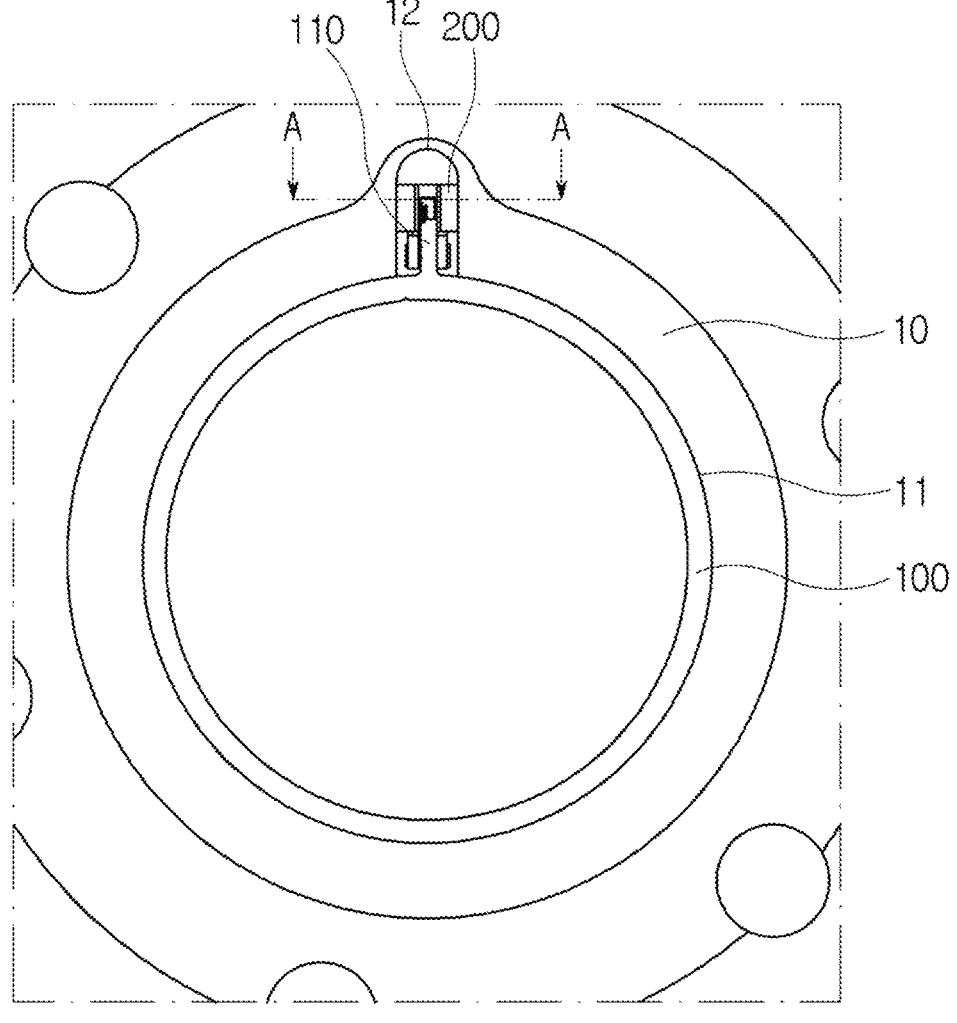
FIG. 5 is a front view illustrating a state in which the airfoil bearing according to the present invention is installed.
Figure 6:
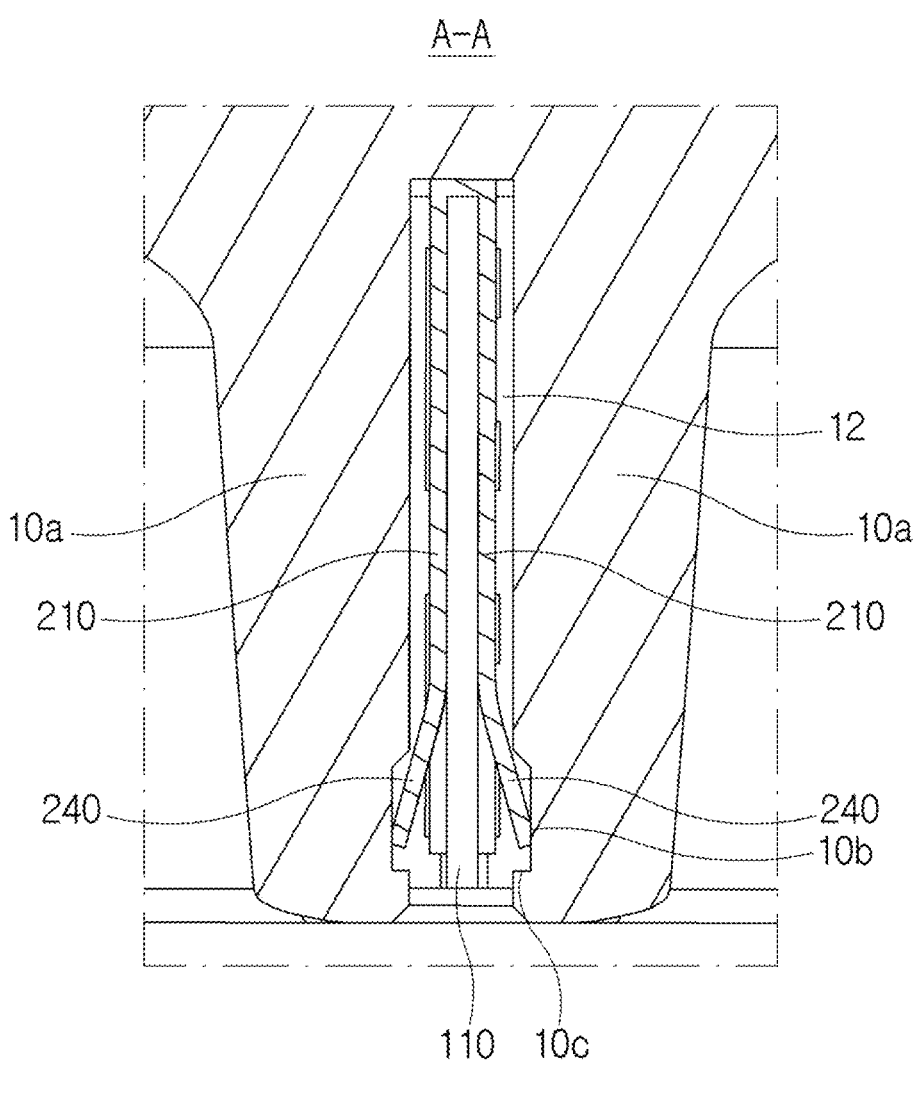
FIG. 6 is a cross-sectional view taken along line A-A in FIG. 5, i.e., a cross-sectional plan view illustrating a bent portion of the airfoil bearing, a spacer, and two opposite side wall bodies of a slot formed in a housing.
Figure 7:
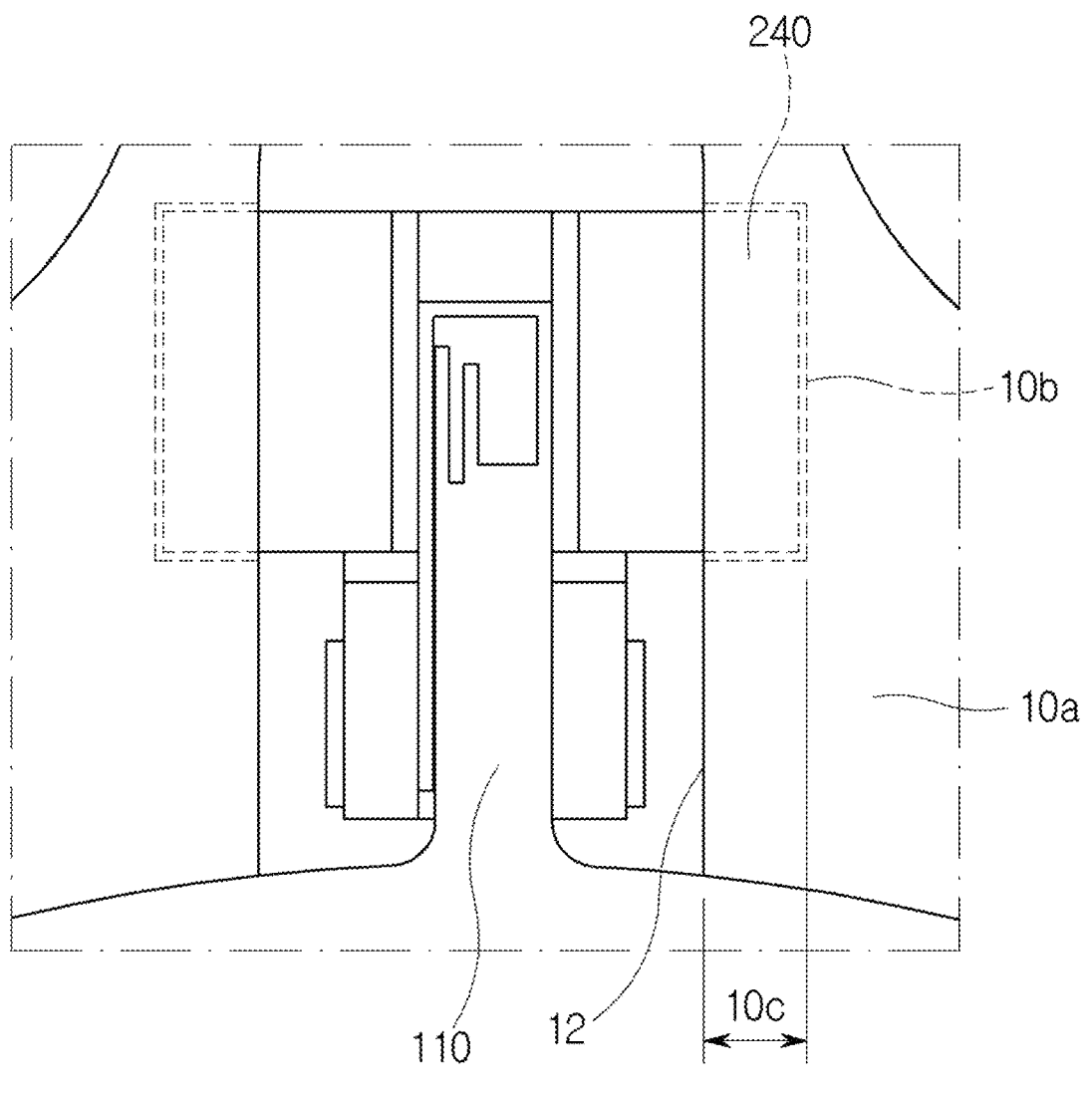
FIG. 7 is a front view of FIG. 6.

The airfoil bearing configured as described above is installed in the housing 10 while having a structure illustrated in FIGS. 5 to 7.

The housing 10 has the circular bearing installation hole 11 into which the foil assembly 100 is inserted. The slot 12 protrudes in the radial direction from one circumferential side of the bearing installation hole 11 and has a length and a width in the axial direction so that the bent portion 110 and the spacer 200 may be accommodated in the slot 12.

Therefore, in the assembled state illustrated in FIG. 4, the rear end (the end adjacent to the connection portion 220 of the spacer 200) of the airfoil bearing is inserted first into the bearing installation hole 11 and the slot 12.

FIG. 5 illustrates a state in which the airfoil bearing is completely inserted into the slot 12 and the bearing installation hole 11 of the housing 10.

Meanwhile, as illustrated in FIG. 6, accommodation portions 10b are concavely formed at an inlet side and formed in inner surfaces of two opposite side wall bodies 10a of the slot 12 to accommodate the catching pieces 240. Catching projections 10c are formed at inlet side ends of the accommodation portions 10b and provided to be perpendicular to the longitudinal direction of the slot 12 (the direction in which the spacer 200 is inserted).

Therefore, when the spacer 200 mounted on the bent portion 110 is inserted into the slot 12, the catching pieces 240 are retracted inward in the transverse direction while passing through the inlet, and then the catching pieces 240 are extended outward in the transverse direction by an elastic restoring force while passing through the catching projections 10c, such that the catching pieces 240 accommodated in the accommodation portions 10b.

Therefore, when the airfoil bearing is about to move in the axial direction when the rotor of the air compressor rotates at high speed, the catching pieces 240 positioned at the two opposite sides of the spacer 200 are caught by the catching projections 10c, thereby preventing the axial movement of the airfoil bearing in the slot 12.

In addition, because the spacer 200 clamps the bent portion 110 of the foil assembly 100, no gap is formed between the bent portion of the bump foil and the bent portion of the top foil that constitute the bent portion 110.

Further, a volume of the spacer 200 prevents a gap from being formed in the transverse direction (the circumferential direction of the bearing installation hole 11) even in the slot 12, thereby preventing the inadvertent circumferential movement of the airfoil bearing.

As described above, the airfoil bearing is prevented from being moved in the circumferential direction and pushed in the axial direction, which makes it possible to more stably support the high-speed rotation of the rotor and assuredly prevent the airfoil bearing from separating from the slot.

In particular, the present invention may achieve the object by simply changing the structure by forming the catching plates 240 on the spacer 200, which is one component of the airfoil bearing, and forming the catching projections 10c on the inner wall of the slot 12. Therefore, it is necessary to install a pin or a catching plate in an inlet of a slot and perform an additional process such as caulking or bolting to prevent the axial separation of the bent portion 110, unlike the related art. Therefore, the number of components and the number of assembling processes are not increased.

In addition, as described above, the number of assembling processes is not increased, and the process of installing the airfoil bearing is completed only by pushing and inserting the airfoil bearing into the slot 12 and the bearing installation hole 11 of the housing 10, such that the process of installing the airfoil bearing is very quickly performed in the air compressor assembling line, thereby improving the productivity.

While the present invention has been described above with reference to the exemplary embodiment depicted in the drawings, the exemplary embodiment is described just for illustration, and those skilled in the art will understand that various modifications of the exemplary embodiment and any other exemplary embodiment equivalent thereto are available. Accordingly, the true technical protection scope of the present invention should be determined by the appended claims.

The invention claimed is:

1. An airfoil bearing installation structure configured to be installed in a housing of an air compressor, the airfoil bearing installation structure comprising:

a foil assembly including a bump foil and a top foil that overlap each other in a cylindrical shape; and a spacer mounted on a bent portion protruding from the foil assembly in a radial direction, the spacer comprising two opposite side plate portions extending in an axial direction and a connection portion connecting axially rear ends of the two opposite side plate portions, wherein the foil assembly and the bent portion are inserted into a bearing installation hole and a slot formed in the housing wherein the spacer is configured to eliminate a circumferential gap in the slot by fitting between the foil assembly and an inner surface of the slot, and wherein catching pieces are formed by cutting axially front end portions of the side plate portions and bending upper portions of the cut areas outward in radial directions.

2. The airfoil bearing installation structure of claim 1, wherein the catching pieces are elastically deformable and restorable in radial inward and outward directions relative to the spacer.

3. The airfoil bearing installation structure of claim 1, wherein accommodation portions are formed in two opposite wall bodies located closer to an inlet side of the slot than an opposing end of the slot so that the catching pieces of the spacer are inserted into the accommodation portions, and catching projections are formed at end portions of the accommodation portions to engage ends of the catching pieces.

4. The airfoil bearing installation structure of claim 1, wherein a plurality of rectilinear fastening holes is formed in the bent portion of the foil assembly, wherein a plurality of fastening holes, equal in number to the plurality of rectilinear fastening holes formed in the bent portion of the foil assembly, is formed in two opposite side plate portions of the spacer, and wherein fastening members are installed through the plurality of rectilinear fastening holes in the bent portion and through corresponding fastening holes of the plurality of fastening holes in the plate portions so that the spacer is fixed to the bent portion.

5. The airfoil bearing installation structure of claim 4, wherein each fastening member comprises:

a base configured to be in surface contact with one radial side surface of the spacer;

extension portions horizontally extending from respective upper side edges of the base and configured to penetrate the fastening holes of the spacer and the bent portion; and catching portions bent in a radial inward direction from ends of the extension portions and configured to be in surface contact with the other radial side surface of the spacer.

6. The airfoil bearing installation structure of claim 1, wherein one end of the spacer is open so that the spacer is axially insertable over an outer circumferential surface of the bent portion of the foil assembly.

* * * * *